(12) United States Patent
Hata et al.

(10) Patent No.: US 6,344,426 B1
(45) Date of Patent: Feb. 5, 2002

(54) POROUS CERAMIC SHEET, PROCESS FOR PRODUCING THE SAME, AND SETTER FOR USE IN THE PROCESS

(75) Inventors: Kazuo Hata; Norikazu Aikawa; Keijirou Takasaki, all of Himeji (JP)

(73) Assignee: Nippon Shokubai Co., Ltd., Osaka (JP)

(*) Notice: Subject to any disclaimer, the term of this patent is extended or adjusted under 35 U.S.C. 154(b) by 0 days.

(21) Appl. No.: 09/462,489

(22) PCT Filed: May 20, 1999

(86) PCT No.: PCT/JP99/02666

§ 371 Date: Jan. 20, 2000

§ 102(e) Date: Jan. 20, 2000

(87) PCT Pub. No.: WO99/59936

PCT Pub. Date: Nov. 25, 1999

(30) Foreign Application Priority Data

May 20, 1998 (JP) .......................................... 10-138451

(51) Int. Cl.$^7$ .............................................. C04B 35/48
(52) U.S. Cl. ...................... 501/103; 264/650; 204/421; 429/30; 429/34; 428/144
(58) Field of Search .......................... 501/103; 264/650, 264/608, 618; 204/421; 429/30, 34; 428/144

(56) References Cited

U.S. PATENT DOCUMENTS 5,702,837 A    12/1997    Xue 5,932,368 A    8/1999    Batawi et al.
6,001,761 A    12/1999    Hata et al.

FOREIGN PATENT DOCUMENTS

| EP | 0 759 479 | 2/1997 |
|---|---|---|
| EP | 0 788 175 | 8/1997 |
| JP | 2-246105 | 10/1990 |
| JP | 7-105954 | 4/1991 |
| JP | 4-147569 | 5/1992 |
| JP | 5-225986 | 9/1993 |
| JP | 8-59347 | 3/1996 |
| JP | 8-162120 | 6/1996 |
| JP | 8-287921 | 11/1996 |
| JP | 8-287926 | 11/1996 |
| JP | 9-180734 | 7/1997 |
| JP | 9-223508 | 8/1997 |

*Primary Examiner*—Paul Marcantoni
(74) *Attorney, Agent, or Firm*—Oblon, Spivak, McClelland, Maier & Neustadt, P.C.

(57) ABSTRACT

The invention provides a setter which comprises a sheet ceramic containing 40% to 90% by weight of an [NiO] unit; a process for producing a porous ceramic sheet containing nickel oxide and stabilized zirconia, by the use of the setter; and a porous ceramic sheet having a ratio X of a ratio Xa relative to a ratio Xb ranging from 0.85 to 1.18, where the ratio Xa is a ratio of an X-ray diffraction peak intensity of the (200) line of nickel oxide relative to an X-ray diffraction peak intensity of the (111) line of the stabilized zirconia on one side of the sheet, and the ratio Xb is a ratio of an X-ray diffraction peak intensity of nickel oxide in the (200) line relative to an X-ray diffraction peak intensity of the (111) line of the stabilized zirconia on the other side, where the ceramic sheet is mainly produced by the process.

19 Claims, 1 Drawing Sheet

POROUS CERAMIC SHEET, PROCESS FOR PRODUCING THE SAME, AND SETTER FOR USE IN THE PROCESS

TECHNICAL FIELD

The present invention relates to a porous ceramic sheet, particularly to a porous ceramic sheet containing nickel and stabilized zirconia which is mainly used for a solid oxide fuel cell, to a process for producing the porous ceramic sheet, and to a setter for use in the process.

BACKGROUND ART

A fuel cell using stabilized zirconia as a solid electrolyte usually has a high working temperature of 900° C. to 1000° C., and is to be exposed to such high temperatures for a long time. It must therefore be composed of a material having an extremely high thermostability, and its anode and cathode must be composed of materials having a coefficient of thermal expansion almost identical to that of the material for the solid electrolyte. These materials can only be selected from a very narrow and limited range and from expensive materials. Accordingly, development has been made to provide solid oxide fuel cells containing a thin film solid oxide electrolyte and having a working temperature ranging from 600° C. to 800° C.

To develop fuel cells using a thin film solid oxide electrolyte, porous ceramic sheet having the following characteristics should essentially be developed. The required characteristics are, for example, high gas permeability, high electrical conductivity, a coefficient of thermal expansion close to that of the electrolyte, high mechanical strength, and satisfactory shock resistance at high temperatures (thermal shock resistance).

Therefore, a porous ceramic sheet composed of nickel oxide-stabilized zirconia is generally used. To improve the gas permeability of such a porous ceramic sheet, it is effective to lower the sintering temperature of the NiO-stabilized zirconia, and to enhance its electrical conductivity, it is effective to increase the Ni content in the NiO-stabilized zirconia. Contrary to this, to improve the mechanical strength of the ceramic sheet, it is desirable to increase the sintering temperature of the NiO-stabilized zirconia and thereby to decrease the porosity, and to make the coefficient of thermal expansion close to that of the electrolyte, it is effective to decrease the Ni content in the NiO-stabilized zirconia. As thus described, the porosity and electrical conductivity are somewhat inconsistent with the mechanical strength, and a porous ceramic sheet which is satisfactory in all these characteristics has not yet been developed in practice.

For instance, Japanese Unexamined Patent Publication No. 4-147569 discloses a ceramic sheet obtained by granulating a powdery mixture of nickel oxide and zirconia to give a granulated powder, forming the granulated powder, and firing the formed powder under a reducing atmosphere to give a ceramic sheet. In general, however, firing under a reducing atmosphere, particularly sintering at 1200° C. or higher causes volumetric shrinkage during reduction, and the resultant product is liable to be cracked. Separately, Japanese Unexamined Patent Publication No. 5-225986 discloses a ceramic sheet obtained by granulating and heat-treating a powdery mixture of nickel oxide and zirconia to give a granulated powder, adding a given amount of a sintering aid to the granulated powder, forming the resultant mixture and firing at 1300° C. to 1600° C. under an oxidizing atmosphere. The addition of such sintering aids is effective for the improvement of mechanical strength. However, nickel oxide or zirconia is liable to undergo a solid state reaction with the sintering aid component at high temperatures to give a complex oxide of nickel oxide or zirconia with the sintering aid component. This complex oxide may deteriorate the gas permeability and electrical conductivity of the ceramic sheet with time.

Japanese Unexamined Patent Publication No. 8-287921 discloses the optimization of particle diameters of nickel oxide and stabilized zirconia to be used as material powders. To be more specific, it discloses a ceramic sheet using a nickel oxide powder having a particle diameter one tenth or less that of stabilized zirconia particles. This is intended to ensure the electrical conductivity and to meet the overall characteristics such as mechanical strength and coefficient of thermal expansion, by rendering nickel oxide particles come interstitially into gaps between stabilized zirconia particles to form an area where the proportion of Ni is high even when the content of nickel oxide is reduced. Such insurance of the electrical conductivity by uneven distribution of nickel, however, deteriorates the homogeneity in electrical conductivity of the porous ceramic sheet, and reduces with time the mechanical strength and thermal shock resistance in long-term use.

Separately, Japanese Unexamined Patent Publication No. 9-223508 discloses an NiO-stabilized zirconia porous ceramic sheet having pores about 1 $\mu$m or less in diameter obtained by a tape casting technique.

The firing for the production of the porous ceramic sheet disclosed in the publication is performed at a high temperature of about 1400° C., and therefore the nickel component is sintered to occlude or excessively narrow the pores or the proportion of nickel oxide is reduced by volatilization, which may deteriorate the gas permeability and electrical conductivity. The uneven distribution of the nickel component may affect changes with time of the mechanical strength and thermal shock resistance and may not meet the stability with time of the electrical conductivity.

When a ceramic sheet is produced by firing a precursor green sheet, it is generally produced by a process of placing a setter of, for example, alumina in a furnace, which alumina setter is available at low costs, and placing the green sheet on the setter. However, these porous ceramic sheets composed of nickel oxide-stabilized zirconia produced by such a process are liable to have decreased strength and electrical conductivity and hence have not meet the characteristics required for solid oxide fuel cell applications.

The invention has been accomplished under these circumstances, and it is an object of the invention to provide a porous ceramic sheet advantageously used in solid oxide fuel cells, which has a satisfactory thermal shock resistance and mechanical strength and exhibits a sufficient permeability against a fuel gas and a desired electrical conductivity, a production process for the ceramic sheet, and a setter for producing a porous ceramic sheet which can advantageously be used in the production process.

DISCLOSURE OF INVENTION

After intensive investigations of causes of deterioration in strength and electrical conductivity in a porous ceramic sheet, the present inventors found that when a green sheet, which is a precursor of a porous ceramic sheet containing stabilized zirconia and nickel oxide, is heat-treated on, for example, a conventional alumina setter, the nickel component in a surface layer of the green sheet scatters or migrates into the alumina setter, and decreases, resulting in reduced mechanical strength and electrical conductivity. The present invention has been accomplished based upon the above finding by improving a process for producing, in particular a setter for producing, a porous ceramic sheet.

To be more specific, the inventive setter for producing a porous ceramic sheet is a setter to be used for the production of a porous ceramic sheet containing nickel oxide and stabilized zirconia, which setter comprises a sheet ceramic containing 40% to 90% by weight of an [NiO] unit. The production setter may preferably be obtained by forming a slurry into a sheet to give a green sheet, the slurry containing 40% to 90% by weight of a nickel oxide powder as material powder, and subjecting the green sheet to a heat treatment at 1300° C. to 1500° C. In this connection, the [NiO] unit means nickel oxide itself or an NiO unit when nickel forms a complex oxide with another component.

The inventive process for producing a porous ceramic sheet includes the steps of: forming a slurry into a sheet to give a green sheet, the slurry containing 20% to 50% by weight of a stabilized zirconia powder and 50% to 80% by weight of a nickel oxide powder, placing the green sheet on the inventive setter, and firing the green sheet on the setter at 1200° C. to 1400° C. It is preferable that the top of the green sheet placed on the setter is covered with another piece of the inventive setter and the covered green sheet is fired. The inventive porous ceramic sheet is a porous ceramic sheet containing nickel oxide and stabilized zirconia, in which a ratio X of a ratio Xa relative to a ratio Xb ranges from 0.85 to 1.18, the ratio Xa is a ratio of an X-ray diffraction peak intensity of the (200) line of nickel oxide relative to an X-ray diffraction peak intensity of the (111) line of the stabilized zirconia on one side of the sheet, and the ratio Xb is a ratio of an X-ray diffraction peak intensity of the (200) line of nickel oxide relative to an X-ray diffraction peak intensity of the (111) line of the stabilized zirconia on the other side. To be more specific, it is a porous ceramic sheet produced by the inventive production process. The inventive porous ceramic sheet preferably has an area of equal to or more than 100 cm$^2$ and a thickness ranging from 50 to 1000 $\mu$m.

BEST MODE FOR CARRYING OUT THE INVENTION

Figure 1:
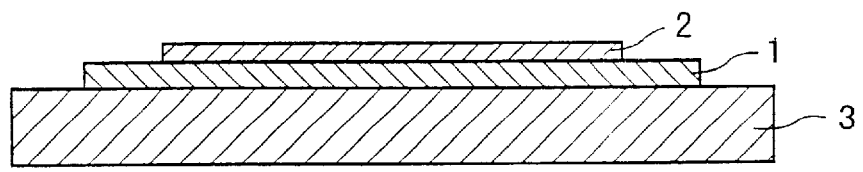
FIG. 1 through FIG. 3 are each a schematic diagram illustrating an embodiment of the process for producing a porous ceramic sheet according to the invention.

[Setter for Producing a Porous Ceramic Sheet]

Initially, a production setter to be used in the inventive process for producing a porous ceramic sheet will now be described.

The inventive production setter is a setter to be used for the production of a porous ceramic sheet containing nickel oxide and stabilized zirconia, to be more specific, a setter to be placed under a green sheet in the firing, which setter is a sheet ceramic containing 40% to 90% by weight an [NiO] unit. The green sheet just mentioned above is a precursor of the ceramic sheet (hereinafter may be referred to as "green sheet for ceramic sheet").

As the setter contains 40% to 90% by weight of the [NiO] unit, migration and reaction, during firing, of nickel oxide contained in the green sheet for ceramic sheet can be prevented. To be more specific, the following is supposed in an alumina setter: A chemical reaction represented by the following formula occurs between the green sheet for ceramic sheet and the alumina setter at high temperatures of about 1000° C. or higher:

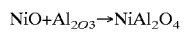

$NiO + Al_2O_3 \rightarrow NiAl_2O_4$

As a result of this solid phase reaction, nickel oxide component contained in the green sheet for ceramic sheet is consumed, and the content of nickel oxide in the resultant ceramic sheet is less than that of the precursor green sheet for ceramic sheet, resulting in an increased porosity, and thereby decreased mechanical strength and reduced electric conductivity. On the contrary, when the setter in contact with the green sheet for ceramic sheet contains nickel oxide in the above proportion, the component of the setter does not further react with nickel oxide in the green sheet for ceramic sheet. In other words, nickel oxide in the green sheet is prevented from reaction and consumption, and nickel oxide does not decrease even if the setter on which the green sheet is placed on an alumina setter and the green sheet is fired.

The composition of the inventive setter has only to be a composition containing 40% to 90% by weight of an [NiO] unit. The other components include, but are not limited to, stabilized zirconia, zircon, alumina, silica, titania, talc, kaolin, bentonite, mullite, steatite, cordierite, clayor China clay, and other compounds and complex compounds; or oxides and other compounds of lanthanum, cerium, and other rare-earth elements, calcium, magnesium, and other alkaline earth metals, cobalt, copper, iron, and other base metals; or mixtures of these compounds The other component and nickel oxide may be a mixture of independent compounds without any solid phase reaction, or may form a complex oxide by the solid state reaction. When they reside as a mixture, the [Nio] unit is a nickel oxide compound, and when they reside as a complex oxide, the [NiO] unit is a unit which can be considered as NiO.

Of the compositions of the setter preferred are a composition containing 40% to 90% by weight of nickel oxide and 10% to 60% by weight of stabilized zirconia, and a spinel ceramic $NiAl_2O_4$ composed of nickel oxide and alumina. The spinel ceramic contains the [NiO] unit and an [$Al_2O_3$] unit in such a ratio that $[NiO]/[Al_2O_3]=42/58$. When the other component is alumina and the content of nickel oxide is less than 42% by weight or more than 42% by weight (i.e., the content of alumina is more than 58% by weight or less than 58% by weight), alumina or nickel oxide which does not constitute the spinel compound is coexistent with the spinel compound. The setter may also have such a composition.

The nickel oxide powder to be used as a material of the setter preferably has a mean particle diameter of 0.1 $\mu$m to 15 $\mu$m, and a particle diameter at 90% by volume of equal to or less than 30 $\mu$m. More preferably, it has a mean particle diameter of 0.5 $\mu$m to 10 $\mu$m and a particle diameter at 90% by volume of equal to or less than 20 $\mu$m.

When stabilized zirconia is used as the other component, the stabilized zirconia preferably has a mean particle diameter of 0.1 $\mu$m to 3 $\mu$m and a particle diameter at 90% by volume of equal to or less than 6 $\mu$m, and more preferably a mean particle diameter of 0.1 $\mu$m to 1.5 $\mu$m and a particle diameter at 90% volume of equal to or less than 3 $\mu$m. When alumina is used as the other component, such alumina preferably has a mean particle diameter of 0.1 to 100 $\mu$m and a particle diameter at 90% by volume of equal to or less than 50 $\mu$m, and more preferably has a mean particle diameter of 0.3 to 50 $\mu$m and a particle diameter at 90% by volume of equal to or less than 30 $\mu$m.

The mean particle diameter and particle diameter at 90% by volume (the particle diameter when the cumulative volume percentage from the minimum particle diameter reaches 90% by volume) are determined by subjecting a sample to ultrasonic dispersion in a 0.2% sodium hexametaphosphate aqueous solution for 1 minute and measuring the dispersed sample with a laser diffraction type particle size distribution analyzer (a product of Shimadzu Corporation: SALD-1100).

The inventive setter is produced by forming a composition having the aforementioned composition into a sheet by, for instance, a conventional doctor blade process, extrusion process or pressing process to give a green sheet (hereinafter referred to as "green sheet for setter" to distinguish from the green sheet for ceramic sheet), and firing the green sheet for setter at 1300° C. to 1500° C. The firing temperature of the green sheet for setter is preferably 50° C. to 300° C. higher than the firing temperature of the green sheet for ceramic sheet. If the green sheet for setter is fired at a temperature lower than the firing temperature of the green sheet for ceramic sheet, the green sheet for setter is also fired during the firing of the green sheet for ceramic sheet, and the green sheet for ceramic sheet may be flawed or cracked due to shrinkage during the firing. On the contrary, if the temperature is excessively high, the nickel component may potentially be molten to reduce the strength of the setter.

When alumina is chosen as the other component, the solid phase reaction occurs during the firing to give a spinel compound, $NiAl_2O_4$. In this case, if the material powder composition, i.e., the ratio of the nickel oxide powder to the powdery alumina ($NiO/Al_2O_3$) is less than 42/58, an excess alumina component remains which has not been compounded into the spinel compound. However, only a small amount of alumina remains as alumina in the setter, and even if the alumina in the setter reacts with nickel oxide in the green sheet for porous ceramic sheet in a contact interface, the decrement of nickel oxide due to this reaction is trace and within the range of X as described later.

The green sheet for setter can be produced according to such a conventionally known process for producing green sheets as disclosed in Japanese Unexamined Patent Publication No. 63-277546.

The inventive setter has the above configuration, and has only to be sheet-form and to have a size larger than that of the green sheet for porous ceramic sheet. Its dimensions are not particularly limited, and it may be a thin sheet 0.1 to 1 mm thick or a thick sheet 5 to 30 mm thick.

The inventive setter may be either dense or porous, but it is preferably a porous material having a porosity of 5% to 50%. This is because when a plurality of green sheets for ceramic sheet are layered with the setters alternately and are fired, such porous sheets allows a decomposed binder composition contained in the green sheets for ceramic to volatile and to scatter from the pores of the setters.

[Process for Producing Porous Ceramic Sheet]

The process for producing a porous ceramic sheet according to the invention is a process comprising the steps of: forming a composition containing 20% to 50% by weight of a stabilized zirconia powder and 50% to 80% by weight of a nickel oxide powder into a sheet to give a green sheet for ceramic sheet, placing the green sheet for ceramic sheet on the inventive setter, and firing the green sheet on the setter at 1200° C. to 1400° C.

Figure 2:
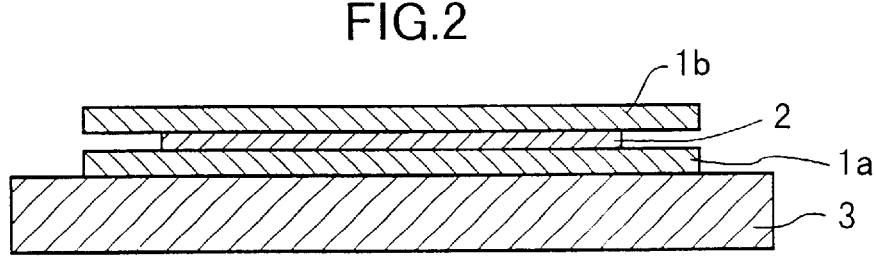
Figure 3:
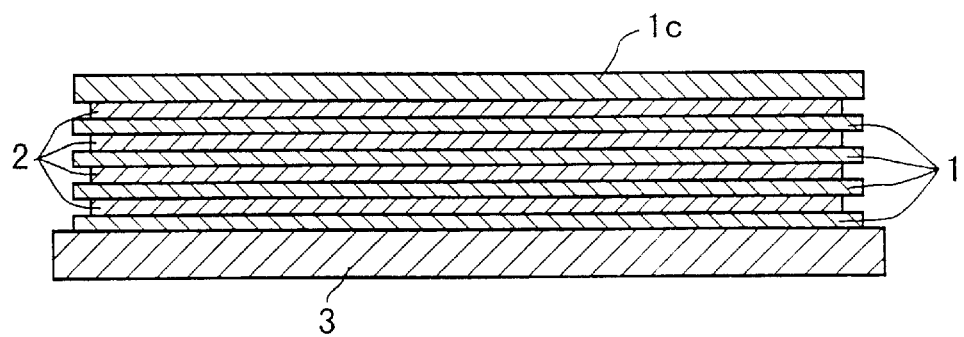

Practical techniques for the placement of the green sheet for ceramic sheet on the setter include: a technique of arranging the inventive setter 1 for the production only at the bottom of the green sheet 2 for ceramic sheet as illustrated in FIG. 1, or a technique of placing not only a setter 1a at the bottom of the green sheet 2 for ceramic sheet but also another setter 1b on top of the green sheet 2, that is, a technique of sandwiching the green sheet 2 for ceramic sheet with the two setters 1a and 1b and firing the same, as shown in FIG. 2. When a plurality of green sheets for ceramic sheet are fired concurrently, it is preferable, before firing, to interpose each of the setters 1 between the green sheets 2, 2 to arrange the green sheets 2 and setters 1 in an alternating manner, as illustrated in FIG. 3. In this case, another setter 1c is preferably placed on top of the topmost green sheet 2. In FIGS. 1 to 3, the numeral 3 denotes a plate (setter) directly placed in a furnace. The species of the plate is not limited, and an alumina plate which has a high sintering temperature and is available at low costs can be employed.

As thus described, when the firing is performed while the inventive setter 1 is interposed between the green sheet 2 for ceramic sheet and the plate 3, the decrement of the nickel component can be prevented, which decrement is due to the migration of the nickel component caused by the reaction in a contact interface between the green sheet 2 for ceramic sheet and the plate or the setter 1. Separately, covering top of the green sheet 2 with the setter 1b prevents the nickel component from volatilizing even if it is fired at high temperatures of about 1400° C.

In this connection, when a plurality of setters are used, all the setters may have an identical composition and size (thickness), but the upper setters 1b and 1c preferably have a thickness larger than the other setters so as to serve as a weight.

In this case, a topmost setter, i.e., a setter to be used as a cover, preferably has a thickness larger than the other setters, because it also serves as a weight.

The green sheet for ceramic sheet is prepared in the following manner: A material powder having a composition of 20% to 50% by weight of a stabilized zirconia powder and 50% to 80% by weight of a nickel oxide powder, a binder, a solvent, and if necessary a plasticizer, a dispersant or the like are kneaded with a ballmill to prepare a slurry, and the slurry is shaped by a general sheet forming process such as the doctor blade process. In this step, a pore former inclusive of carbon particles, or sublimate or pyrolyzable organic particles may be added for the adjustment of pore size. The green sheet can be prepared by, in addition to the doctor blade process, a calendering roll process or extrusion process, or such a process as disclosed in Japanese Unexamined Patent Publication No. 63-277546.

The prepared green sheet for ceramic sheet is cut and punched into a given shape, is placed on the setter or is sandwiched by two setters, and is fired at 1200° C. to 1400° C., preferably at 1300° C. to 1350° C. When the temperature is lower than 1200° C., the mechanical strength of the resultant ceramic sheet is insufficient, on the contrary, if it exceeds 1400° C., the nickel component is molten and made more volatile, and the pores become too small to give a desired gas permeability.

As described above, the inventive production process which utilizes the setter of the invention can prevent decrement of the nickel component due to migration, reaction or volatilization during the production of an NiO-zirconia ceramic sheet, and it can yield an NiO-zirconia ceramic sheet with facility and stability, which ceramic sheet can retain satisfactory characteristics according to the composition of the material. According to the inventive production process, therefore, the inventive porous ceramic sheet can be produced with facility, which porous ceramic sheet meets required characteristics including, for example, thermal shock resistance, mechanical strength, gas permeability, and electrical conductivity and can advantageously be applied to solid oxide fuel cells.

[Porous Ceramic Sheet]

The inventive porous ceramic sheet is a ceramic sheet being electrically conductive and having thermal shock resistance, mechanical strength and a satisfactory gas permeability.

The concrete configuration of the inventive porous ceramic sheet which can meets the above requirements will be described below.

The inventive porous ceramic sheet is a porous ceramic sheet containing nickel oxide and stabilized zirconia, in which 20% to 50% by weight of zirconium oxide (sic, correctly "stabilized zirconia") and 50% to 80% by weight of nickel oxide, and preferably 30% to 40% by weight of zirconium oxide (sic, correctly "stabilized zirconia") and 60% to 70% by weight of nickel oxide are blended.

The stabilized zirconia is obtained by adding one or more oxides as stabilizers to $ZrO_2$ to give a solid solution. Such oxides can be selected from, but are not limited to, MgO, CaO, SrO, BaO and other oxides of alkaline earth metals; $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Er_2O_3$, $Tm_2O_3$, $Yb_2O_3$, and other oxides of rare-earth elements; $Sc_2O_3$, $Bi_2O_3$, and $In_2O_3$. Of these, zirconium oxide which is stabilized with 2% to 12% by mole of yttria (YSZ) is preferably employed.

The stabilized zirconia powder to be used as a material is advantageously a powder having a mean particle diameter of 0.1 to 3 $\mu$m and a particle diameter at 90% by volume of equal to or less than 6 $\mu$m, preferably having a mean particle diameter of 0.1 to 1.5 $\mu$m and a particle diameter at 90% by volume of equal to or less than 3 $\mu$m, and more preferably having a mean particle diameter of 0.2 to 1 $\mu$m and a particle diameter at 90% by volume of equal to or less than 2 $\mu$m. The nickel oxide powder to be used as a material is advantageously a powder having a mean particle diameter of 0.1 to 15 $\mu$m and a particle diameter at 90% by volume of equal to or less than 30 $\mu$m, preferably a powder having a mean particle diameter of 0.3 to 3 $\mu$m and a particle diameter at 90% by volume of equal to or less than 20 $\mu$m, and more preferably having a mean particle diameter of 0.5 to 1.5 $\mu$m and a particle diameter at 90% by volume of equal to or less than 10 $\mu$m. In particular, if the porous ceramic sheet is used as a member of a solid oxide fuel cell, the particle diameter of nickel oxide at 90% by volume should be equal to or less than 6 $\mu$m and preferably equal to or less than 3 $\mu$m to avoid inclusion of coarse particles.

The above ranges are defined for the following reasons: If a powdery mixture of a stabilized zirconia powder having a mean particle diameter exceeding 3 $\mu$m and a particle size at 90% by volume exceeding 6 $\mu$m, and a nickel oxide powder having a mean particle diameter exceeding 15 $\mu$m and a particle diameter at 90% by volume exceeding 30 $\mu$m is used as the material powder, the resultant ceramic sheet not only becomes porous due to calcination but also has vacancies in the gaps between the particles and therefore it fails to have a desired thermal shock resistance and mechanical strength. On the contrary, the use of a powdery mixture of a stabilized zirconia powder having a mean particle diameter less than 0.1 $\mu$m and a nickel oxide powder having a mean particle diameter less than 0.1 $\mu$m results in deteriorated porosity, and hence sufficient gas permeability is not obtained.

The material of the inventive porous ceramic sheet can contain, for example, cerium oxide or lanthanum oxide) doped with gadolinium oxide or another rare-earth oxide instead of the stabilized zirconia.

The porosity of the inventive porous ceramic sheet has the above configuration and ranges from 5% to 50%, preferably from 10% to 40%. If it is less than 5%, the gas permeability becomes insufficient, on the contrary, if it exceeds 50%, the mechanical strength and thermal shock resistance become insufficient. The mean pore size should preferably fall in the range from 0.1 $\mu$m to 1 $\mu$m.

The inventive porous ceramic sheet has a ratio X of a ratio Xa relative to a ratio Xb ranging from 0.85 to 1.18, where the ratio Xa is a ratio of an X-ray peak intensity of the (200) line of nickel oxide relative to an X-ray diffraction peak intensity of the (111) line of the stabilized zirconia on one side of the sheet, and the ratio Xb is a ratio of an X-ray peak intensity of the (200) line of nickel oxide relative to an X-ray diffraction peak intensity of the (111) line of the stabilized zirconia on the other side.

As the zirconia component appears not to migrate or volatile after the firing and its concentration is considered to be constant before and after the firing, the ratios Xa and Xb are considered to correspond to the decrement of nickel. In other words, X ranging from 0.85 to 1.18 means that both Xa and Xb are equal to or more than 0.85, that is, the decrement of nickel on each side is within 15%, and that the closer X approaches 1, the more homogeneously is nickel oxide distributed from the surface side to the back side of the ceramic sheet.

In this connection, in the case that nickel oxide component decreases on both sides alike, for example in the case the green sheet sandwiched between two alumina setters is fired, the solid phase reaction occurs on both sides alike, i.e., on the top side and bottom side, and X appears to approach one. The nickel component is, however, liable to migrate toward the bottom by gravity, and X does not fall in the range from 0.85 to 1.18, even though the nickel component decreases when the reaction with the setters.

The X-ray diffraction peak intensity ratio on each side of the ceramic sheet was determined with the use of an X-ray diffractometer RU-300 manufactured by Rigaku Industrial Corporation with CuKα 1–50 kV/300 mA K X-ray, a wide-angle goniometer, and a curved crystal monochrometer under conditions of a scanning speed of 4° /min and scanning step of 0.01°. As the X-ray diffraction (XRD) peak intensities of the stabilized zirconia and nickel oxide in each line, a peak intensity at around a interplaner spacing d=2.97 angstroms reads a peak intensity of the (111) line of a stabilized zirconia tetragonal or cubic crystal, and a peak intensity at around a interplaner spacing d=2.09 angstroms reads a peak intensity of the (200) line of a nickel oxide cubic crystal. The ratio X can be obtained by calculating the ratios (NiO peak intensity/zirconia peak intensity) of the peak intensity of the (200) line of nickel oxide relative to the peak intensity of the (111) line of zirconia on both sides, the surface side and back side, of the sheet.

The inventive porous ceramic sheet should preferably have an area of 100 $cm^2$ or more and a thickness of about 50 to 1000 $\mu$m when it is used for solid oxide fuel cells. The shape of the inventive ceramic sheet is not especially limited, and can be chosen according to the shape of the anode of the fuel cell to be applied to. It may be any of square, rectangular, strip, polygon, polygon with R-shaped corner, circular, or ellipse, and the sheet may be any of these shapes further having a hole in the form of, for example, circular, ellipse, or polygon with R-shaped corner.

The porous ceramic sheet having the above configuration is obtained by mixing a powdery mixture of nickel oxide and stabilized zirconia having the composition of the ceramic sheet, a solvent, a binder, a solvent, and where necessary a plasticizer, a dispersant or the like to give a slurry, forming the slurry into a sheet by a conventional sheet forming technique such as the doctor blade process to give a green sheet, cutting the green sheet to a given size, and firing the cut green sheet. Preferably, the ceramic sheet is produced by the inventive production process, i.e., a process of firing the green sheet while placing the green sheet on the inventive setter or sandwiching the same between the inventive setters. According to the production process using the inventive setter, decrement of nickel oxide component in the green sheet caused by migration or volatilization can be prevented with facility, and the resultant ceramic sheet can have a nickel oxide content which is nearly identical to that in the composition of the green sheet and is distributed homogeneously from the surface side to the back side of the green sheet. Accordingly, the ceramic sheet can meet the mechanical strength, thermal shock resistance, electrical conductivity, gas permeability and other characteristics required as solid oxide fuel cell members. Such characteristics can be obtained based upon the composition of the material.

When the inventive porous ceramic sheet is used as a member of a solid oxide fuel cell, the porous ceramic sheet is to support a thin film anode and/or a thin film electrolyte. For this purpose, any of techniques can adequately be employed, including VSP and other plasma spraying techniques, flame spraying technique, PVD (physical vapor deposition), magnetron sputtering, electron beam PVD, and other vapor phase deposition techniques; and screen printing process, sol-gel process, slurry coating process, and other wet processes. The thin film anode is adjusted to have a thickness of 3 to 300 μm, preferably 5 to 100 μm, and the thin film electrolyte is adjusted to have a thickness of 3 to 100 μm, preferably 5 to 30 μm.

EXAMPLES

The invention will be further illustrated in detail with reference to several examples below which are not directed to limiting the scope of the invention.

[Methods for Measurement and Estimation]

The methods for measurement and estimation used in the following examples will be described below.

(1) Peak Intensity Ratio (X)

The peak intensity ratio was determined with the use of an X-ray diffractometer RU-300 manufactured by Rigaku Denki Industrial Corporation with CuKα 1–50 kV/300 mA K X-ray, a wide-angle goniometer, and a curved crystal monochrometer under conditions of a scanning speed of 4°/min and scanning step of 0.01°. The peak intensity (zirconia peak intensity) at around an interplanner spacing d=2.97 angstroms reads and corresponded to an X-ray intensity of the (111) line of a zirconia tetragonal or cubic crystal; and a peak intensity (NiO peak intensity) at around an interplanar spacing d=2.09 angstroms reads and corresponded to an X-ray intensity of the (200) line of a nickel oxide cubic crystal. In this procedure, the ratio (NiO peak intensity/zirconia peak intensity) of the NiO peak intensity relative to the zirconia peak intensity on one side of the ceramic sheet was defined as Xa, and the ratio on the other side was defined as Xb, and the ratio X was determined as a ratio (Xa/Xb) of Xa relative to Xb.

(2) Thermal Shock Resistance

The thermal shock resistance test was performed in the following manner: A sample porous ceramic sheet was retained in an electric furnace at 800° C. for 2 hours, and then immediately taken out from the furnace to the outside at room temperature and retained for 10 minutes, then this procedure, i.e., putting into an electric furnace at 800° C. and taking out from the furnace to the outside at room temperature, five times. The formation of cracks was then visually observed.

When cracking was observed, the measurement was defined as the repetition number at the time when the cracking was first observed visually.

(3) Mechanical Strength (kgf/cm$^2$)

Each porous ceramic sheet was cut with a diamond cutter to give a strip test piece 4×50 mm in size, and its 3-point bending strength was determined according to the method described in Japanese Industrial Standards (JIS) R-1601.

(4) Porosity (%)

The porosity was determined by the mercury penetration method.

(5) Electrical Conductivity

Each porous ceramic sheet was cut to a given shape with a diamond cutter, and the cut piece was subjected to a heat treatment at 1300° C. under a hydrogen atmosphere for 3 hours to give a test piece, and the electrical conductivity of the test piece was determined by the DC four-terminal method.

[Preparation of Production Setter]

Production Setter A

A zirconia powder stabilized by 8% by mole of yttrium oxide (hereinafter briefly referred to as "8YSZ") (40% by weight) and a nickel oxide powder (60% by weight) were mixed to give a material powdery mixture, where the stabilized zirconia powder had a mean particle diameter of 0.5 μm and a 90%-by-volume-diameter of 1.2 μm and nickel oxide powder was obtained by pyrolysis of a nickel carbonate powder and had a mean particle diameter of 4.5 μm and a 90%-by-volume-diameter of 8 μm. To 100 parts by weight of the powdery mixture were added 12 parts by weight of an acrylic binder, 40 parts by weight of toluene/ethyl acetate mixture (2/1 by weight) as a solvent, and 2 parts by weight of dibutyl phthalate as a plasticizer, where the acrylic binder was a copolymer composed of 79.5% by weight of an isobutyl methacrylate unit, 20% by weight of a 2-ethylhexyl methacrylate unit and 0.5% by weight of methacrylic acid. The resultant mixture was kneaded with a ballmill, and was then degassed and adjusted in viscosity to give a slurry having a viscosity of 40 poise, and the slurry was formed into a sheet by the doctor blade process to give an NiO-zirconia green sheet about 0.5 mm thick.

The green sheet was then cut to a given size, and was placed on an alumina plate 20 mm thick and fired at 1400° C. for 5 hours to give an NiO-zirconia production setter A 150 mm square in size, 0.4 mm in thickness and 15% in porosity.

Production Setter B

A green sheet for setter having a thickness of 0.3 mm was prepared in the same manner as in the setter A, and was fired at 1350° C. for 3 hours, as in the setter A, to give a production setter B 170 mm square in size, 0.2 mm in thickness and 20% in porosity.

Production Setter C

A total of 58% by weight of an alumina powder (Al-15, a product of Showa Denko Co., Ltd.) having a mean particle diameter of 55 μm and 42% by weight of a nickel oxide powder having a mean particle diameter of 4.5 μm which was obtained by the pyrolysis of a nickel carbonate powder were mixed and calcined at 800° C. to give a powdery mixture.

The powdery mixture was formed into a sheet in the same manner as in the setter A to give a green sheet for setter having a thickness of about 0.4 mm.

The obtained green sheet was cut to a given size and was fired at 1400° C. for 5 hours to give a production setter C 200 mm square in size, 0.3 mm in thickness, 5% in porosity having a crystal structure of nickel aluminate spinel.

Production Setter D

Using an alumina powder (Al-15, a product of Showa Denko Co., Ltd.) having a mean particle diameter of 55 μm, an alumina green sheet about 0.5 mm thick was obtained in the same manner as in the setter A. The green sheet was then cut to a give size and was fired at 1550° C. for 5 hours to give a production setter D 150 mm square in size, 0.4 mm in thickness and 30% in porosity.

Production Setter E

A dense alumina plate (SSA-A, a product of Nikkato Corporation) was used as a production setter E.

Production Setter F

A setter was prepared in the same manner as in the setter A, except that the proportions of the 8YSZ powder and nickel oxide powder were changed to 70% by weight for 8YSZ and 30% by weight for nickel oxide. As a result, a setter F 150 mm square in size, 0.4 mm in thickness and 18% in porosity was obtained.

The compositions, sizes and porosity of the setters A through F are set forth in Table 1. The setters A through C are the setters according to the invention.

TABLE 1

| | Production setter | | |
|---|---|---|---|
| | Composition (material, weight ratio) | Size | Porosity |
| A | NiO/8YSZ = 6/4 | 150 mm square 0.4 mm thick | 5 |
| B | NiO/8YSZ = 6/4 | 170 mm square 0.2 mm thick | 20 |
| C | Spinel NiAl$_2$O$_4$ (NiO/Al$_2$O$_3$ = 42/58) | 200 mm square 0.3 mm thick | 5 |
| D | Porous alumina | 150 mm square 0.4 mm thick | 30 |
| E | Dense alumina | 150 mm square 2.6 mm thick | 0 |
| F | NiO/8YSZ = 3/7 | 150 mm square 0.4 mm thick | 18 |

[Preparation of Green Sheet for Porous Ceramic Sheet]

Green Sheet a

A total of 30% by weight of a 8YSZ powder and 70% by weight of a nickel oxide powder (a product of Kishida Chemical Co., Ltd.) were mixed to give a powdery mixture, where the 8YSZ powder had a mean particle diameter of 0.3 μm and a 90%-by-volume-diameter of 0.8 μm and nickel oxide powder had a mean particle diameter of 0.9 μm and a 90%-by-volume-diameter of 1.5 μm. To 100 parts by weight of the powdery mixture were added 15 parts by weight of an acrylic binder, 40 parts by weight of toluene/ethyl acetate mixture (2/1 by weight) as a solvent, and 2 parts by weight of dibutyl phthalate as a plasticizer, where the acrylic binder was a copolymer composed of 79.5% by weight of an isobutyl methacrylate unit, 20% by weight of a 2-ethylhexyl methacrylate unit and 0.5% by weight of methacrylic acid. The resultant mixture was kneaded with a ballmill, and was then degassed and adjusted in viscosity to give a slurry having a viscosity of 30 poise, and the slurry was formed into a sheet by the doctor blade process to give an NiO-zirconia green sheet a 0.3 mm thick.

Preparation of Green Sheet b

A green sheet was prepared in the same manner as in the green sheet a, except that the material 8YSZ powder and nickel oxide powder were changed to those having the mean particle diameters and 90%-by weight-diameters indicated in Table 2.

TABLE 2

| | Green Sheet for Ceramic Sheet | | | | |
|---|---|---|---|---|---|
| | | Nio powder | | 8YSZ powder | |
| | Composition (NiO/8YSZ) | Mean particle diameter (μm) | 90%-by-volume-diameter (μm) | Mean particle diameter (μm) | 90%-by-volume-diameter (μm) |
| a | 7/3 | 0.9 | 1.5 | 0.3 | 0.8 |
| b | 7/3 | 0.5 | 0.9 | 0.7 | 1.5 |

[Preparation and Estimation of Porous Ceramic Sheet]

A series of porous ceramic sheets Nos. 1 to 9 each having the dimensions indicated in Table 3 were obtained by placing each of the setters and green sheets shown in Table 3 on an alumina plate 20 mm thick, and firing at 1300° C. for 3 hours. For the other green sheets than No. 3, a 130-mm or 190-mm square green sheet was used, and for No. 3, a 150-mm diameter circular green sheet was employed. The figure in an upper row of the dimensions indicated in Table 3 demonstrates the length of a side or the diameter, and the figure in a lower row demonstrates the thickness.

The firing was performed under any of the following conditions: where the setter was placed only at the bottom of the sheet as shown in FIG. 1 (referred to as "only bottom" in Table 3); where the green sheet was sandwiched between the setters as illustrated in FIG. 2 (referred to as "sandwiched" in Table 3); where green sheets and setters were piled up in an alternating manner, and other setters were further arranged on top and bottom of the pile so that the topmost and bottom green sheets were respectively sandwiched between the setters (referred to as "sandwiched pile" in Table 3); or where no setter was used (referred to as "placed on plate" in Table 3). Sheets Nos. 1 to 4 were porous ceramic sheets manufactured by the use of the inventive setters A to C.

The X-ray diffraction peak intensities were measured on both sides of each of the prepared ceramic sheets, and the peak intensity ratio X was determined. Separately, the thermal shock resistance, mechanical strength, porosity and electrical conductivity were determined according to the above estimation methods. The measurements are shown in Table 3.

TABLE 3

| | | | Green sheet | | Pourous ceramic sheet | | Estimation | | | |
|---|---|---|---|---|---|---|---|---|---|---|
| | | | | | | | Thermal | | | Electrical |
| No | Setter Species | sapecies | Size (mm) | Firing condition | Size (mm) | X = Xa/Xb | shock resistance | Mechanical strength | Porosity (%) | Conductivity (S/cm) |
| 1 | A | a | 130 0.3 | Only bottom | 100 0.23 | 1.48/1.36 = 1.02 | none | 20 | 20 | 750 |
| 2 | A | a | 130 | Sandwiched | 100 | 1.53/1.50 = | none | 20 | 22 | 800 |

TABLE 3-continued

| | | | Green sheet | | Pourous ceramic sheet | | Estimation | | | |
|---|---|---|---|---|---|---|---|---|---|---|
| No | Setter Species | sapecies | Size (mm) | Firing condition | Size (mm) | X = Xa/Xb | Thermal shock resistance | Mechanical strength | Porosity (%) | Electrical Conductivity (S/cm) |
| 3 | B | a | 0.3 150 0.4 | Sandwiched pile | 0.23 120 0.3 | 1.02 1.52/1.59 = 0.94~ 0.99 | none | 20 | 23 | 800~820 |
| 4 | C | b | 190 0.6 | Only bottom | 150 0.5 | 1.60/1.45 = 0.91 | none | 23 | 15 | 780 |
| 5 | — | a | 130 0.3 | Placed on plate | 100 0.23 | 1.81 | 4 times | 16 | 25 | 700 |
| 6 | D | a | 130 0.3 | Only bottom | 100 0.23 | 1.57 | 5 times | 18 | 27 | 640 |
| 7 | E | a | 130 0.3 | Only bottom | 100 0.23 | 2.49 | 5 times | 15 | 29 | 550 |
| 8 | D | a | 130 0.3 | Sandwiched | 100 0.23 | 0.78 | 5 times | 13 | 24 | 760 |
| 9 | F | a | 130 0.3 | Only bottom, | 100 0.23 | 1.34 | none | 18 | 18 | 680 |

Any of the ceramic sheets Nos. 1 to 4 obtained by the use of the inventive setters had the ratio X within the range from 0.85 to 1.18. In addition, any of the porous ceramic sheets Nos. 1 to 4 showed no crack formation in the thermal shock resistance test, had a 3-point bending strength of 20 kgf/cm$^2$ or more, and an electrical conductivity of 750 S/cm or more. The comparison between the setters No.1 and No.2 demonstrates that the decrement of the nickel component can be minimized and the porosity and electrical conductivity can be improved by covering the sheet with the inventive setter in addition to placing the setter at the bottom of the sheet.

On the contrary, all the ceramic sheets Nos. 5 to 8 which were manufactured by placing the green sheet directly on an alumina setter or a plate had a ratio X much deviated from 1 and had deteriorated thermal shock resistance, mechanical strength and electrical conductivity. The sheet No. 8 had a ratio X of 0.78 which was not so far from the range specified in the invention, but it had a high porosity, and lower thermal shock resistance and mechanical strength than the sheets Nos. 5 to 7, because the nickel component was decreased on both sides in large amounts. In this connection, the ratio X deviates from the range specified in the invention in such a case that the nickel component is reduced on both sides as in the sheet No. 8. This is provably because the nickel component is liable to migrate downward by gravity and to be consumed there.

In the sheet No. 9, a NiO-zirconia setter was used but the weight proportion of NiO to zirconia was out of the range specified in the invention. Accordingly, decrement of the nickel component was not sufficiently prevented, and the sheet No. 9 had a larger porosity and lower mechanical strength and electrical conductivity than the sheet No. 1.

What is claimed is:

1. A setter for producing a porous ceramic sheet, said porous ceramic sheet containing nickel oxide and stabilized zirconia, comprising a sheet ceramic containing 40% to 90% by weight of an [NiO] unit.

2. A setter for producing a porous ceramic sheet according to claim 1, wherein said setter is obtained by forming a slurry into a sheet to give a green sheet, said slurry containing 40% to 90% by weight of a nickel oxide powder as a powdery material, and subjecting said green sheet to a heat treatment at 1300° C. to 1500° C.

3. A process for producing a porous ceramic sheet, said process comprising the steps of:

forming a slurry into a sheet to give a green sheet, said slurry containing 20% to 50% by weight of a stabilized zirconia powder and 50% to 80% by weight of a nickel oxide powder as powdery materials, placing said green sheet on a setter of claim 1, and firing said green sheet on the setter at 1200° C. to 1400° C.

4. A process for producing a porous ceramic sheet, said process comprising the steps of:

forming a slurry into a sheet to give a green sheet, said slurry containing 20% to 50% by weight of a stabilized zirconia powder and 50% to 80% by weight of a nickel oxide powder as powdery materials, placing said green sheet on a setter of claim 2, and firing said green sheet on the setter at 1200° C. to 1400° C.

5. A process for producing a porous ceramic sheet according to claim 3, wherein the top of said green sheet placed on the setter is covered with another setter and the covered green sheet is fired, wherein said another setter comprises a sheet ceramic containing 40% to 90% by weight of an [NiO] unit.

6. A process for producing a porous ceramic sheet according to claim 3, wherein the top of said green sheet placed on the setter is covered with another setter and the covered green sheet is fired, wherein said another setter is obtained by forming a slurry into a sheet to give a green sheet, said slurry containing 40% to 90% by weight of a nickel oxide powder as a powdery material, and subjecting said green sheet to a heat treatment at 1300° C. to 1500° C.

7. A process for producing a porous ceramic sheet according to claim 4, wherein the top of said green sheet placed on the setter is covered with another setter and the covered green sheet is fired, wherein said another setter is obtained by forming a slurry into a sheet to give a green sheet, said slurry containing 40% to 90% by weight of a nickel oxide powder as a powdery material, and subjecting said green sheet to a heat treatment at 1300° C. to 1500° C.

8. A porous ceramic sheet containing nickel oxide and stabilized zirconia, wherein a ratio X of a ratio Xa relative to a ratio Xb ranges from 0.85 to 1.18, said ratio Xa is a ratio of an X-ray diffraction peak intensity of the (200) line of nickel oxide relative to an X-ray diffraction peak intensity of the (111) line of the stabilized zirconia on one side of said sheet, and said ratio Xb is a ratio of an X-ray diffraction peak intensity of the (200) line of nickel oxide relative to an X-ray diffraction peak intensity of the (111) line of the stabilized zirconia on the other side.

9. A porous ceramic sheet which is produced by a production process according to claim 3.

10. A porous ceramic sheet which is produced by a production process according to claim 4.

11. A porous ceramic sheet which is produced by a production process according to claim 5.

12. A porous ceramic sheet which is produced by a production process according to claim 6.

13. A porous ceramic sheet which is produced by a production process according to claim 7.

14. A porous ceramic sheet according to claim 8, which has an area of equal to or more than 100 cm$^2$ and a thickness of 50 to 1000 $\mu$m.

15. A porous ceramic sheet according to claim 1, which has an area of equal to or more than 100 cm$^2$ and a thickness of 50 to 1000 $\mu$m.

16. A porous ceramic sheet according to claim 10, which has an area of equal to or more than 100 cm$^2$ and a thickness of 50 to 1000 $\mu$m.

17. A porous ceramic sheet according to claim 11, which has an area of equal to or more than 100 cm$^2$ and a thickness of 50 to 1000 $\mu$m.

18. A porous ceramic sheet according to claim 14, which is used for a solid oxide fuel cell.

19. A porous ceramic sheet according to claim 15, which is used for a solid oxide fuel cell.

* * * * *